US007773772B2

(12) United States Patent
Oizumi

(10) Patent No.: US 7,773,772 B2
(45) Date of Patent: Aug. 10, 2010

(54) IMAGE GENERATION DEVICE AND METHOD FOR VEHICLE

(75) Inventor: Ken Oizumi, Tokyo (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1083 days.

(21) Appl. No.: 11/473,622

(22) Filed: Jun. 23, 2006

(65) Prior Publication Data

US 2006/0291698 A1 Dec. 28, 2006

(30) Foreign Application Priority Data

Jun. 24, 2005 (JP) ............................ 2005-184491

(51) Int. Cl.
*G06K 9/00* (2006.01)

(52) U.S. Cl. ...................... 382/104; 382/100; 382/112; 340/907; 340/933

(58) Field of Classification Search ................. 382/100, 382/104, 112, 305; 340/907, 933, 934, 935; 348/148, 135, 143, 113; 345/158, 562, 537, 345/538
See application file for complete search history.

(56) References Cited

U.S. PATENT DOCUMENTS

| | | | | |
|---|---|---|---|---|
| 5,790,403 | A | 8/1998 | Nakayama | |
| 6,111,702 | A | 8/2000 | Nalwa | |
| 6,373,518 | B1 * | 4/2002 | Sogawa | 348/43 |
| 6,393,163 | B1 | 5/2002 | Burt et al. | |
| 6,928,194 | B2 | 8/2005 | Mai et al. | |
| 6,944,395 | B2 * | 9/2005 | Hara | 396/52 |
| 7,098,914 | B1 | 8/2006 | Katayama et al. | |
| 7,110,021 | B2 * | 9/2006 | Nobori et al. | 348/148 |
| 7,139,412 | B2 | 11/2006 | Kato et al. | |
| 7,400,782 | B2 | 7/2008 | Zhou et al. | |

(Continued)

FOREIGN PATENT DOCUMENTS

EP 0 949 818 A2 10/1999

(Continued)

OTHER PUBLICATIONS

European Patent Application No. 06253292.4 Extended Search Report dated Oct. 20, 2006.

(Continued)

*Primary Examiner*—Samir A. Ahmed
*Assistant Examiner*—Ali Bayat
(74) *Attorney, Agent, or Firm*—Young Basile

(57) ABSTRACT

A device and method for easy correction of camera installation errors in a vehicle. A device comprises an input frame buffer receiving pixel data representing camera-generated images, a rearrangement table describing rules for rearrangement of the pixel data, an error-correction table describing rules for adjusting the pixel data to correct an installation error of the cameras, an output frame buffer receiving rearranged pixel data for display and a controller reading the pixel data from the input frame buffer, rearranging the pixel data based on the rearrangement and/or the error-correction table and storing rearranged pixel data in the output frame buffer. The method includes preparing plural error-correction tables corresponding to a magnitude of an installation error, displaying the composite image and correcting the installation error using at least one of the error-correction tables as a reference for a respective image used to create the composite image.

18 Claims, 12 Drawing Sheets

U.S. PATENT DOCUMENTS

| | | | |
|---|---|---|---|
| 7,499,079 | B2 | 3/2009 | Evans, Jr. et al. |
| 2004/0100443 | A1 * | 5/2004 | Mandelbaum et al. ...... 345/158 |
| 2004/0183898 | A1 | 9/2004 | Endo et al. |
| 2004/0207831 | A1 | 10/2004 | Aoyama |
| 2004/0260469 | A1 * | 12/2004 | Mizusawa .................. 701/300 |
| 2005/0265631 | A1 | 12/2005 | Mai et al. |

FOREIGN PATENT DOCUMENTS

| | | |
|---|---|---|
| EP | 1 094 668 A2 | 4/2001 |
| JP | 09-159442 | 6/1997 |
| JP | 2004-64441 | 2/2004 |
| WO | WO 2005/074287 A1 | 8/2005 |

OTHER PUBLICATIONS

Mircea Nicolescu et al., Electronic Pan-Tilt-Zoom: A Solution for Intelligent Room Systems, Integrated Media Systems Center, Los Angeles, CA, 2000 IEEE.

Ramin Shahidi et al., Implementation, Calibration and Accuracy Testing of an Image-Enhanced Endoscopy System; Dec. 12, 2002.

Juyang Weng, et al., Camera Calibration with Distortion Models and Accuracy Evaluation, Oct. 1992.

* cited by examiner

IMAGE GENERATION DEVICE AND METHOD FOR VEHICLE

TECHNICAL FIELD

The present invention pertains to an image generation device for a vehicle and its method that let the driver of the vehicle readily discern the state around the automobile.

BACKGROUND

Technology for correcting distortion of an optical system for images of the surroundings of a vehicle is described in, for example, Japanese Kokai Patent Application No. 1997-159442. For the environment recognition device for a vehicle described therein, when an arithmetic operation is performed symmetrically to left/right images based on the image data read from the image memory, a correction coordinate table is set to store correction coordinates (Δx, Δy). These coordinates are prepared based on the distortion data of images obtained when the image of a checkerboard grid pattern as the object is taken by the optical part and the image pickup means. Then, by means of the corrected coordinates (X+Δx, Y+Δy) obtained by correcting the scan coordinates (X, Y) with the correction coordinates (Δx, Δy), a read image memory address is generated from the image memory. As a result, it is possible to avoid situations in which the image distortion cannot be handled based on distortion in the optical system.

In this reference, when distortion of the optical system is corrected by reading coordinates (X+Δx, Y+Δy) obtained by adding the address correction coordinates (Δx, Δy) read from the correction coordination table, the image can be read at the correct position coordinates. Then, an electric bulb is set at a known space position, and the deviation from the undistorted position is written as address correlation coordinates (Δx, Δy) in the table. The address correction coordinates are determined from measured data instead of from computations.

BRIEF SUMMARY OF THE INVENTION

In accordance with one aspect of the invention, an image generation device and its method of use are provided for easy correction of a camera installation error. The image generation device can be used on a vehicle having at least one camera and a monitor that displays an image derived from images generated by the at least one camera. The image generation device can include an input frame buffer operable to receive pixel data representing images generated by at least one camera, a rearrangement table that describes rules for rearrangement of the pixel data, an error-correction table that describes rules for adjusting the pixel data to correct an installation error of the at least one camera, an output frame buffer for receiving rearranged pixel data for display as an image on the monitor, and a controller operable to read the pixel data from the input frame buffer, to rearrange the pixel data based on at least one of the rearrangement table and the error-correction table and to store the rearranged pixel data in the output frame buffer.

The image generation method can be used in a vehicle incorporating an image generation device that receives images of surroundings of the vehicle from at least one camera and displays a composite image to the driver. The method can include, for example, preparing plural error-correction tables corresponding to a magnitude of an installation error of the at least one camera, displaying the composite image and correcting the installation error of a respective camera using at least one of the plural error-correction tables as a reference for a respective image used to create the composite image.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

For an image generation device for a vehicle that takes a photograph of the surroundings of the automobile as input, stores the input image as a collection of pixels in a frame buffer for input, outputs the stored pixel data after image conversion (rearrangement of the input pixel data), and presents the image to the driver, when the direction of the camera differs from the assumed direction due to installation errors (errors pertaining to direction: pitch, yaw, and roll), the output image may be affected.

Correction of these installation errors can be difficult. For example, when correction is performed on the manufacturing line, that is, the direction of the camera itself is corrected by means of physical changes, fine adjustment is difficult and takes a significant amount of time. A physical adjustment mechanism also increases cost. In addition, when the image-conversion rule (that is, rearrangement) is re-computed, the computing itself takes time. These factors result in delay in the manufacturing process, and this is undesirable.

The following embodiments provide an image generation device for a vehicle and its method that can easily correct camera installation error. In the following, an explanation will be given in detail of the embodiments with reference to the figures. In those figures, the same part numbers will be used throughout, and they will only be explained once.

Figure 1:
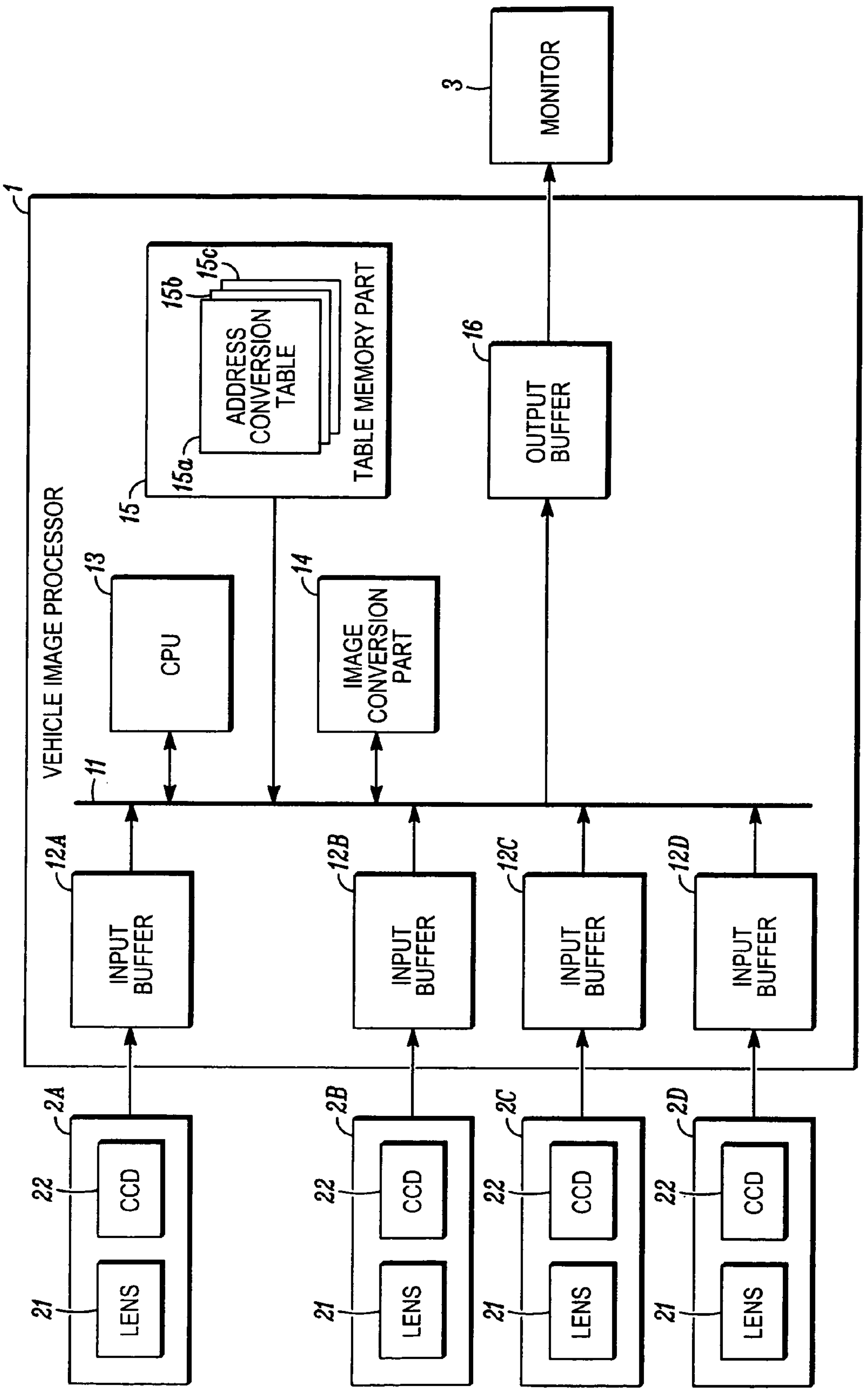
FIG. 1 is a block diagram showing a vehicle image processor used with embodiments of the invention.
Figure 2:
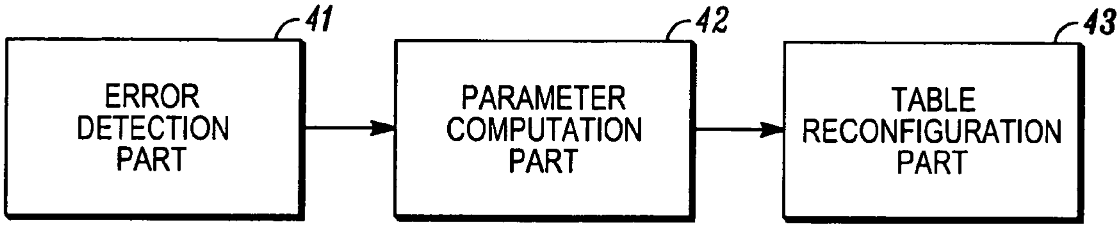
FIG. 2 is a block diagram showing the configuration for reconfiguring address conversion tables.

A vehicle image processor 1 in accordance with a first embodiment is shown in FIG. 1. In the case of the vehicle image processor 1, camera image data captured around the vehicle by camera modules 2A, 2B, 2C, and 2D are input to input buffers 12A, 12B, 12C, and 12D, which correspond to respective camera modules 2A, 2B, 2C, and 2D. Perspective conversion is applied by a CPU 13 and an image conversion part 14 using default or non-reconfigured tables stored in a table memory part 15 so as to generate a panoramic image around the vehicle. Data on the panoramic image are stored in an output buffer 16 and output to a monitor 3. The vehicle image processor 1 reconfigures, or calibrates, the default address conversion tables using function parts 41 through 43 as shown in FIG. 2, for example, so as to correct the effect of camera modules 2A, 2B, 2C, and 2D in order to display the panoramic image on monitor 3 with less distortion in the panoramic image or any deviation between respective images that constitute the panoramic image. The default or non-reconfigured address conversion tables provide address conversion information to generate a panoramic image based on the assumption that there a no installation errors in camera modules 2A, 2B, 2D and 2D.

Figure 3:
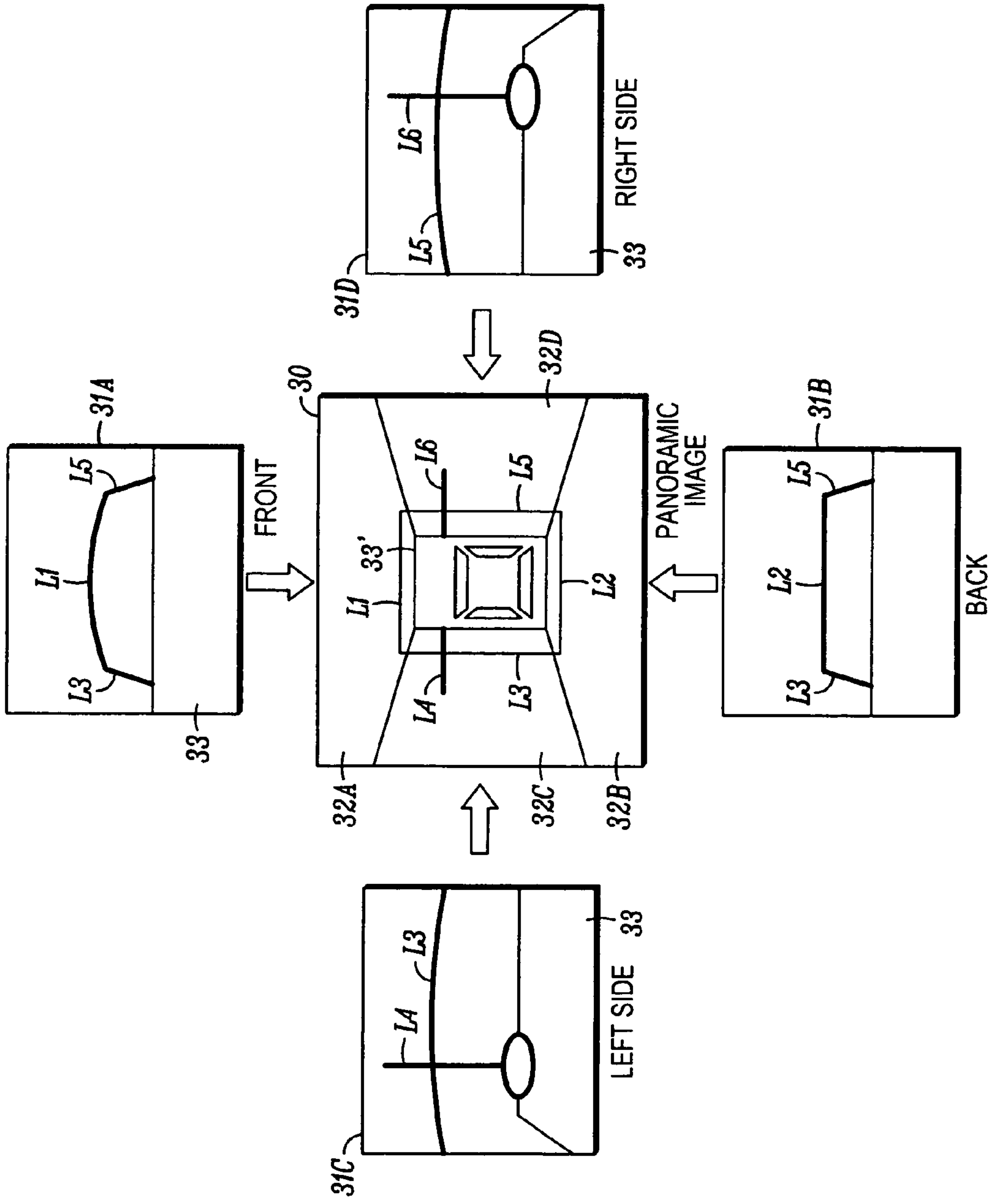
FIG. 3 is a diagram illustrating the process for generating a panoramic image through the application of perspective conversion to image data captured by cameras installed in different pickup directions.

More specifically, as shown in FIG. 3, a front camera image 31A is captured by camera module 2A, a rear camera image 31B is captured by camera module 2B, a left-side camera image 31C is captured by camera module 2C, and a right-side camera image 31D is captured by camera module 2D in order to generate a panoramic image 30 around the vehicle. Here, camera image 31A includes a vehicle body 33 and white lines L1, L3, and L5 that are drawn on the road surface. Camera image 31B includes vehicle body 33 and white lines L2, L3, and L5. Camera image 31C includes vehicle body 33 and white lines L3 and L4. Camera image 31D includes vehicle body 33 and white lines L5 and L6. The white lines that appear in panoramic image 30 are drawn on the road surface and captured by camera modules 2A, 2B, 2C, and 2D for the purpose of illustrating distortion and deviation between the images that appear in the panoramic image.

Under ideal conditions (that is, where camera modules 2A, 2B, 2C and 2D are assumed to have no errors in their installation positions), vehicle image processor 1 generates panoramic image 30, which is arranged around an automobile object 33' without any deviation between the constituent pixels of panoramic image 30 using a front image 32A, a rear image 32B, a left-side image 32C and a right-side image 32D. These images are obtained by converting respective camera images 31A, 31B, 31C, and 31D, as seen from the top.

Figure 4:
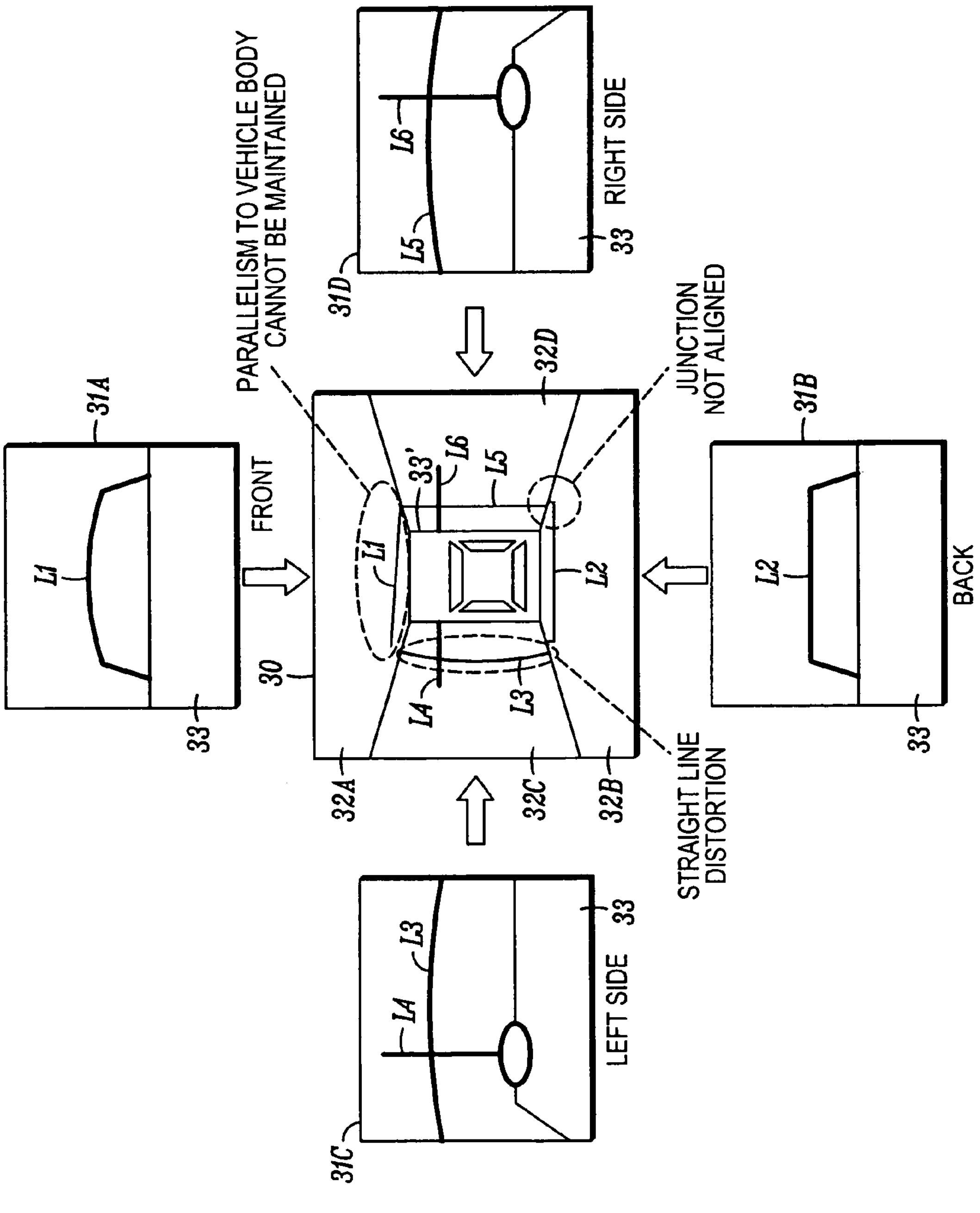
FIG. 4 is a diagram illustrating problems during processing for generating a panoramic image by applying perspective conversion to camera image data captured in different pickup directions when camera modules have installation errors.

On the other hand, if camera modules 2A, 2B, 2C, and 2D contain errors in their installation positions, as shown in FIG. 4, white line L1 in front image 32A results in a mismatch with automobile object 33' after the change of the perspective, white line L3 becomes distorted, or white lines L1, L2, and L3 are shifted to run across pixels 32A, 32B, and 32C, which constitute panoramic image 30. However, in the case of vehicle image processor 1 explained below, processing is carried out so as to correct deviation and distortion in panoramic image 30 attributable to installation errors of the camera modules 2A, 2B, 2C, and 2D used to generate panoramic image 30. By means of this processing, the deviation and distortion in panoramic image 30 are suppressed, even when camera modules 2A, 2B, 2C, and 2D contain installation errors.

The configuration and operations for generating panoramic image 30 in which distortion and/or deviation is eliminated from respective camera images 31A, 31B, 31C and 31D will be explained below. First is a general description of the theory, which is followed by examples of possible embodiments.

1-1 Concepts of Camera Simulation: Position and Direction of Camera

Figure 5:
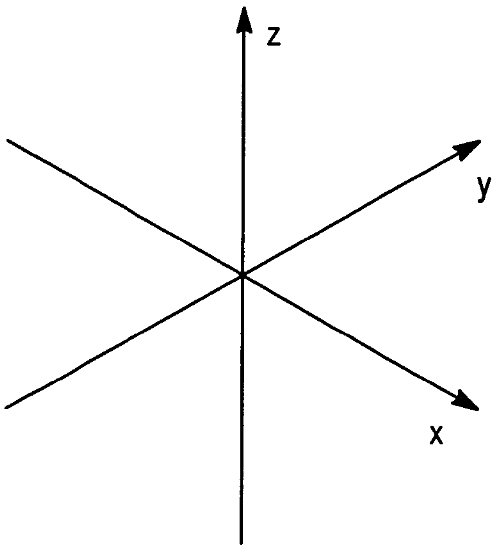
FIG. 5 is a diagram illustrating a general mathematical coordinate system for a camera simulation.

FIGS. 5-11 are diagrams illustrating camera simulation. FIG. 5 illustrates a general mathematical coordinate system.

As shown in FIG. 5, a general mathematical coordinate system is used to represent (x, y, z). The x-axis, y-axis and z-axis are orthogonal to each other. The units can be freely selected as long as they are uniform. Generally, millimeter units are used. The camera position is defined as a point in this space.

Figure 6:
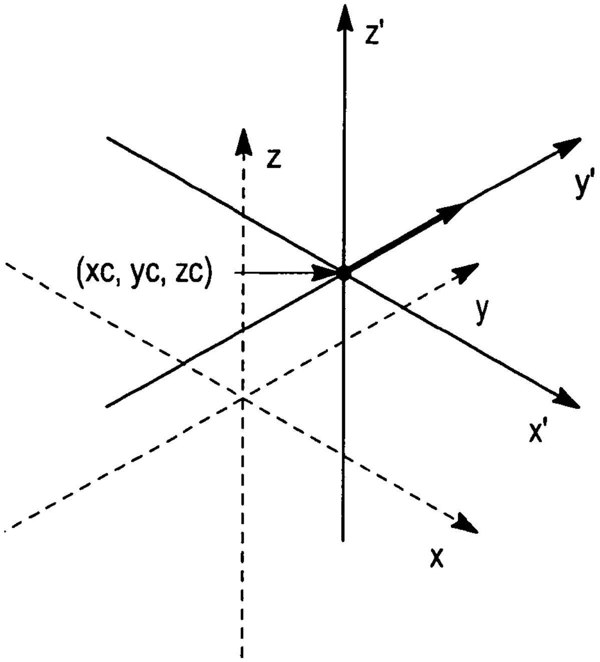
FIG. 6 is a diagram illustrating a camera position in the coordinate system for a camera simulation.

As shown in FIG. 6, an x'-axis, a y'-axis and a z'-axis are drawn at the camera position (xc, yc, zc) and are drawn parallel to the x-axis, y-axis and z-axis, respectively. The reference direction (pitch=0, yaw=0) becomes the positive direction of the y'-axis. In FIG. 6, the thicker arrow indicates the reference direction. Also, the units in assigning the pitch, yaw and roll are degrees.

Figure 7:
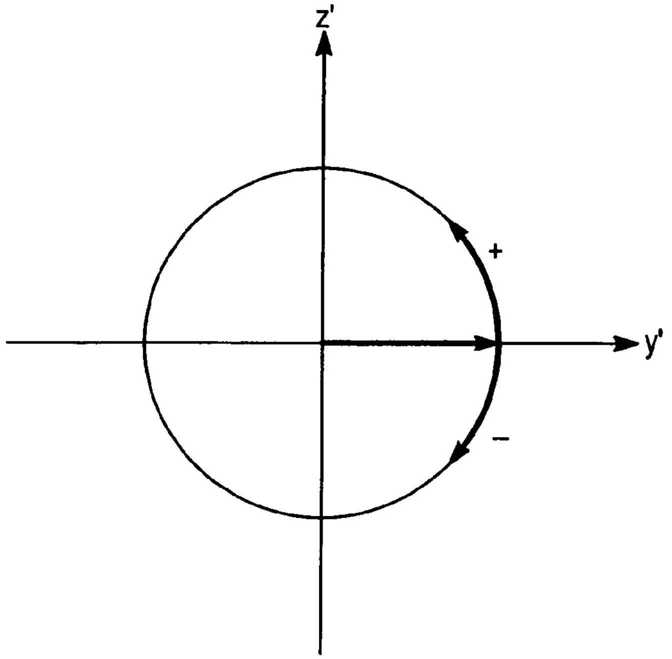
FIG. 7 is a diagram illustrating pitch with respect to the diagram according to FIG. 6.
Figure 8:
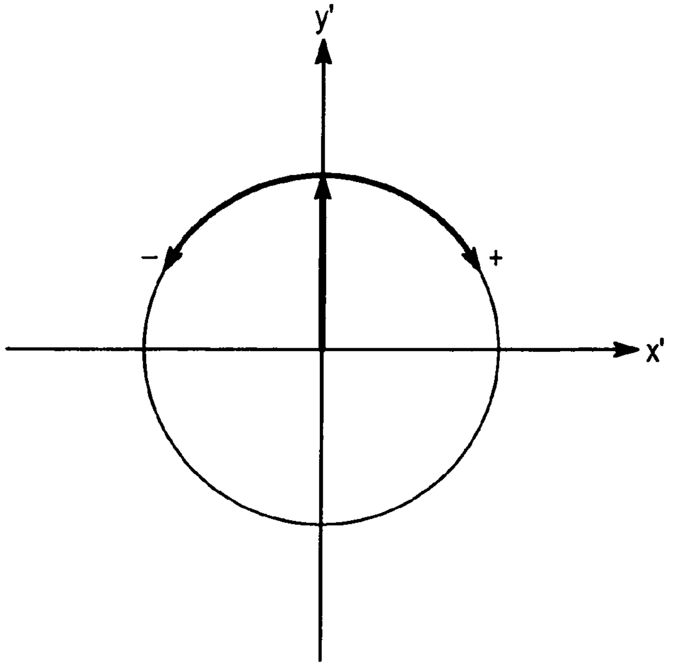
FIG. 8 is a diagram illustrating yaw with respect to the diagram according to FIG. 6.
Figure 9:
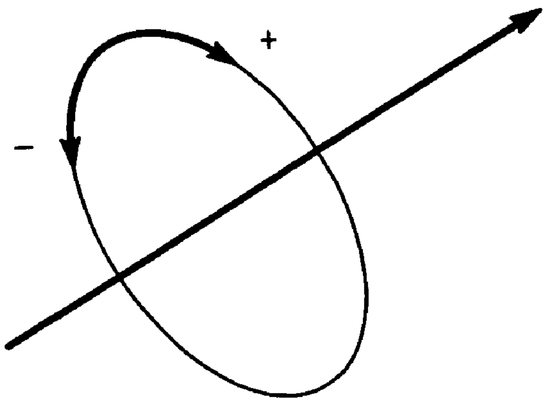
FIG. 9 is a diagram illustrating roll with respect to the diagram according to FIG. 6.

FIG. 7 is a diagram illustrating pitch, FIG. 8 is a diagram illustrating yaw, and FIG. 9 is a diagram illustrating roll.

As shown in FIGS. 6 and 7, the pitch indicates the angle of rotation around the x'-axis. A value of 0° is parallel to the x-y plane. The positive direction includes upward angles, while the negative direction includes downward angles. When the y'-z' plane is seen from the positive direction of the x'-axis, plus is counterclockwise rotation, and minus is clockwise. A value +90° orients directly upward (positive direction of the z'-axis), and a value −90° orients directly downward (negative direction of the z'-direction). Values up to ±180° are accepted.

As shown in FIGS. 6 and 8, the yaw indicates the angle of rotation around the z'-axis. When the x'-y' plane is viewed from the positive direction of the z'-axis, clockwise becomes a positive value, and counterclockwise becomes a negative value.

As shown in FIG. 9, the roll indicates the rotation around the axis that indicates the camera direction defined by the pitch and yaw. When the camera is viewed from behind, clockwise becomes positive, and counterclockwise becomes negative.

Concerning processing of the camera direction, first, the pitch direction is processed. Then, the yaw direction is processed. Finally, the roll direction is processed. Consequently, when pitch=90 or pitch=−90, assignment of the yaw direction becomes an operation of the roll direction. Also, when the pitch is such that pitch>90 or pitch<−90, the camera is inverted.

The six parameters of x, y, z, pitch, yaw and roll are used to assign the setting state of the camera.

1-2. Concepts of Camera Simulation: Camera Simulation

Figure 10:
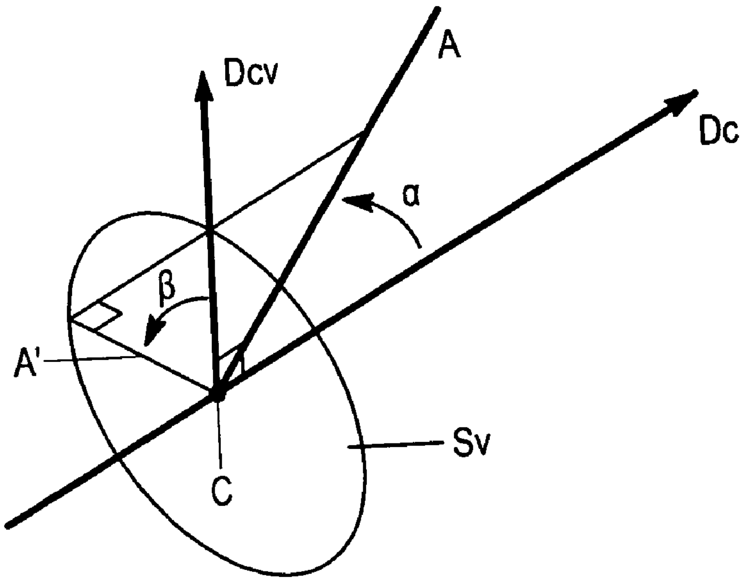
FIG. 10 is a diagram illustrating reference directions and a light ray incident on the camera in a camera simulation.

As shown in FIG. 10, point C indicates the camera and is taken as the origin. Reference direction Dc and direction Dcv perpendicular to direction Dc are defined. Direction Dc represents the direction of the camera, and direction Dcv represents the upward direction of the camera. Here, the plane that can be defined by rotating Dcv around Dc is designated Sv.

Consider light ray A incident on the camera (point C). The angle between light ray A and direction Dc is angle α. Also, the angle formed between A' obtained by projecting A parallel to Dc on Sv and Dcv is angle β. In this case, angle α is always in the range of 0.0 deg≦α≦180.0 deg. For angle β, when plane Sv is viewed in the direction of Dc, the clockwise direction is the +direction. In FIG. 10, light ray A can be represented as (α, −β).

In the following description, how light ray r is mapped on the output image of the camera is defined.

Figure 11:
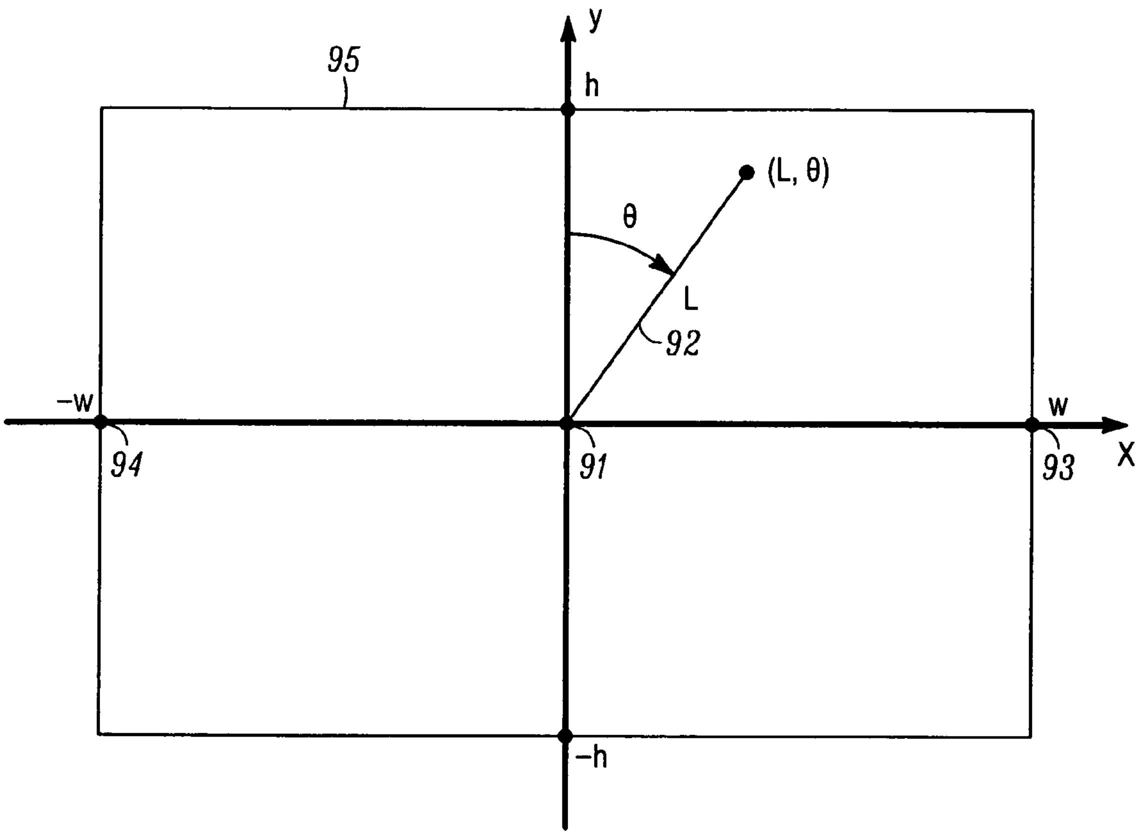
FIG. 11 is a simplified output image of a camera.

FIG. 11 is a representation of the output image of the camera. The output image is set on the x-y plane. Central point 91 of the image is set to be in agreement with the origin of the x-y plane. Also, line segment 92 extends vertically upward from point 91 (y>0 on the y-axis). Polar coordinates (L, θ) are considered with reference to point 91 and line segment 92. The clockwise direction from line segment 92 is considered to be the positive direction of θ. A point on the output image can be represented by x-y coordinates (x, y) or polar coordinates (L, θ).

If a light ray is perpendicularly incident from the front side of the camera (α=0.0°, β=any value), it is possible to consider the case when an image is taken of the center of the output image, that is, point 91. Also, for light ray (α, β), when angle β is fixed at 0.0, and angle α is increased from 0.0, because the change is toward incidence from above the camera, it is believed that on the output image of the camera there is a movement on line segment 92 towards the positive direction of y. Here, as direction Dcv indicating the upward direction of the camera (see FIG. 10) is deemed to be correlated with segment 92, and because incident angle α and distance L from origin 91 on the output image are correlated with each other, one has L=fc (α), θ=β.

For convenience, the following is a summarized representation:

$$(L, \theta)=fc(\alpha, \beta).$$

As the inverse function of fc, fci is defined as follows:

$$\alpha=fci(L), \beta=\theta; \text{ and}$$

this formula also can be summarized and represented as follows:

$$(\alpha, \beta)=fci(L, \theta).$$

With these formulas, point (L, θ) on the image and light ray (α, β) incident on the camera are correlated with each other.

In order to restrict the image pickup range of the camera, image pickup area 95 (the photographic plane) is set on the plane in FIG. 11. A location within the area is deemed to be the image pickup region, and a location outside of the area is deemed to be out of the image pickup region. When the horizontal image angle of the camera is represented as h_max°, light ray (α=(h_max/2)°, β=90.0°) can be plotted as point 93 in FIG. 11. Similarly, light ray (α=(h_max/2)°, β=−90.0°) can be plotted as point 94. Consequently, the range in the lateral direction of image pickup area 95 when the horizontal image angle is h_max° becomes −fc (h_max/2)~fc (h_max/2) in the x-coordinate range. This is set as −w-w. The range in the longitudinal direction of image pickup area 95 can be determined from the aspect ratio of the image pickup plane and the range in the lateral direction. For example, if the aspect ratio of the screen is 3:4, when represented by the y-coordinate, the range of image pickup area 95 in the longitudinal direction becomes −3 w/4-3w/4. Of course, the range may also be computed from the vertical image angle. This range is set as −h-h.

As explained above, it is possible to determine the range of image pickup area 95.

Figure 12:
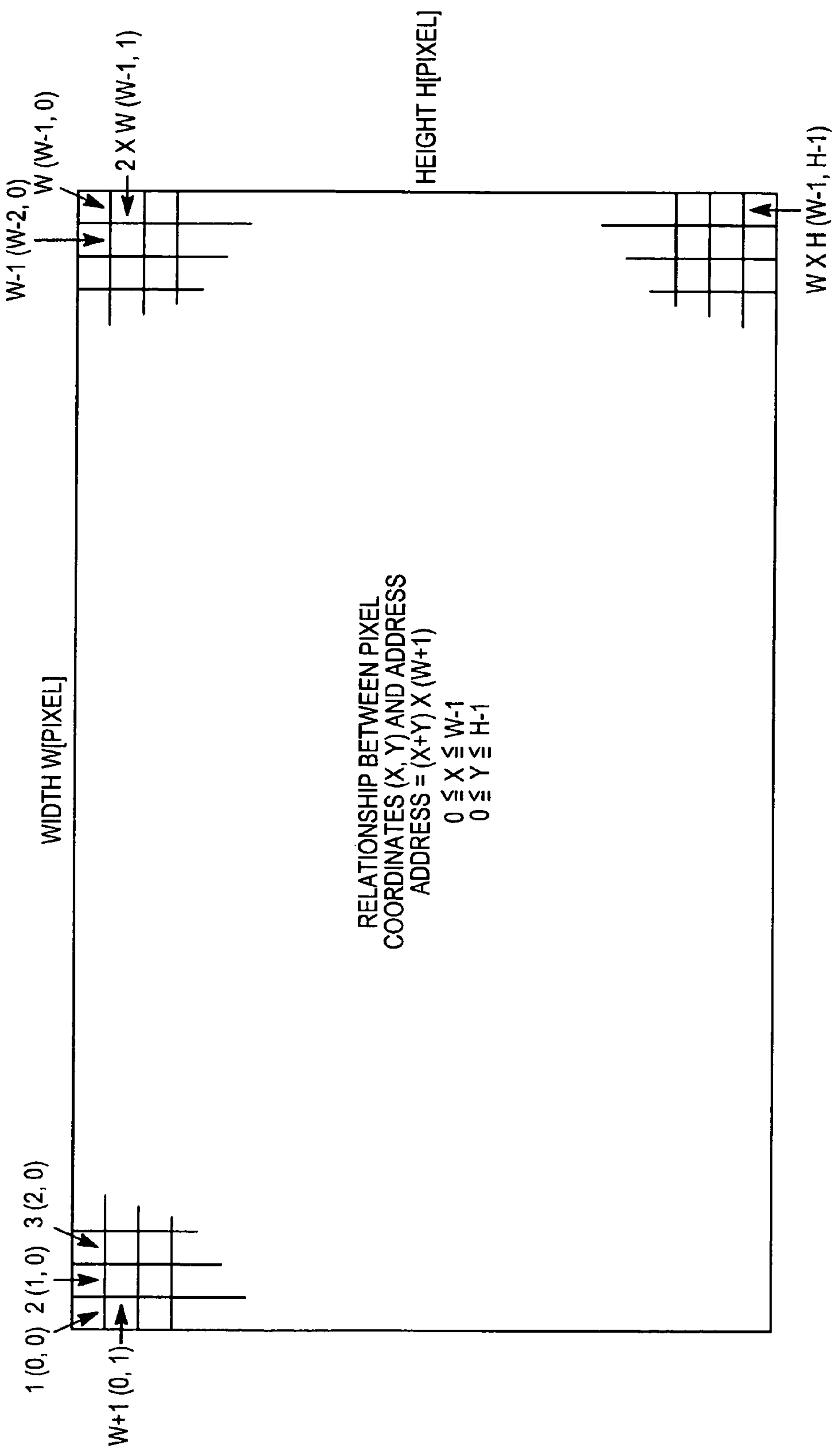
FIG. 12 is an illustration of the coordinates and addresses of a frame buffer and table according to FIG. 11.

FIG. 12 is a diagram that illustrates in a partially-pixellated representation of FIG. 11 the frame buffer and the coordinates and address of the table.

As shown in FIG. 12, image pickup area 95 shown in FIG. 11 can be divided into W pixels in the lateral direction and H pixels in the vertical direction as generally adopted in a conventional CG. In this case, usually, the upper-left pixel is represented by the XY coordinates of (0, 0), and the lower-right pixel is (W-1, H-1). The formula for conversion of the XY coordinates shown in FIG. 12 and the (L, θ) coordinates shown in FIG. 11 is defined as follows:

$$(X, Y)=fs(L, \theta).$$

Also, inverse function fsi of function fs is defined as $$(L, \theta)=fsi(X, Y).$$

It is possible to determine functions fs and fsi from the parameters w, h, W and H.

Function fc represents the characteristics of the lens. For example, in the case of a lens having the optical characteristics of an fθ system, one has L=k×θ where k is a constant, and θ is the incident angle. Because function fc is used to define the image pickup area, as long as k has a value of 0.0 or larger, the same result can be obtained for any value. In the case of a pinhole camera, one has L=tan (θ).

One may also adopt a scheme in which approximate formula Y=F (θ) is determined from plural groups of the data of incident angle θ and image height Y, and it is adopted as is in L=fc (θ).

As explained above, it is possible to define the following relationship between incident light ray (α, β) and pixel cell coordinates (X, Y) of the output image:

$$(X, Y)=fs(fc(\alpha, \beta)); \text{ and}$$

$$(\alpha, \beta)=fci(fsi(X, Y)).$$

In the XY coordinate system, because X and Y are each rounded to positive integers, instead of a perfect inverse function, this is an approximation. When X, Y are both real numbers, it is possible to compute a perfect inverse function.

1-3. Concepts of Camera Simulation: Image Pickup of Point in Space

In the following description, based on the position and direction of the camera as described in section 1-1 and the camera simulation defined in section 1-2, the relationship between space point (xp, yp, zp) and pixel (Xp, Yp) on the output image of the camera can be determined. If the position of the camera is (xc, yc, zc), the direction of the camera becomes (pitch, yaw, roll).

With the camera position (xc, yc, zc) used as offset, the following function that shifts by −xc, −yc, −zc in the space coordinate x, y, z directions, respectively, is defined so that the camera position comes to the origin:

$$(sx, sy, sz)=fo((x, y, z), (xc, yc, zc)).$$

Also, the following inverse function is defined:

$$(x, y, z)=foi((sx, sy, sz), (xc, yc, zc)).$$

Applied to the space point (xp, yp, zp), one has:

$$fo((xp, yp, zp), (xc, yc, zc)).$$

Then, when the z-axis is deemed to be the center, and the x-y plane is viewed in the direction from the + direction to the − direction of the z-axis where the clockwise direction is the positive direction, the following function is defined for rotation of the space coordinates by θ°.

$$(rzx, rzy, rzz)=rollZ((x, y, z), \theta).$$

The above arithmetic operation result is rotated around the z-axis by −yaw°. This leads to:

$$rollZ(fo((xp, yp, zp), (xc, yc, zc)), -yaw).$$

Then, when the x-axis is deemed to be the center, and the y-z plane is viewed in the direction from the + direction to the – direction of the x-axis where the clockwise direction is deemed to be the positive direction, the function for rotating the space coordinates by θ° is defined as follows:

(rxx, rxy, rxz)=rollX((x, y, z), θ).

The result of the arithmetic operation performed above is rotated around the x-axis for −pitch°. Here, the result becomes:

rollX (rollZ(fo((xp, yp, zp), (xc, yc, zc)), −yaw), −pitch).

Then, when the y-axis is deemed to be the center, and the x-z plane is viewed in the direction from the – direction to the + direction of the y-axis where the clockwise direction deemed to be the positive direction, the following function of rotation of space coordinates (x, y, z) by θ° is defined as follows:

(ryx, ryy, ryz)=rollY((x, y, z), θ).

The result of arithmetic operation performed above is rotated around the y-axis by −roll°. The result becomes:

rollY(rollX(rollZ(fo((xp, yp, zp), (xc, yc, zc)), −yaw), −pitch), −roll).

As a result of this computation, it is possible to determine the coordinates (xp', yp', zp') when space point (xp, yp, zp) is viewed with reference to the direction of the camera. This operation is summarized, and the following is defined:

(x', y', z')=fd((x, y, z), (xc, yc, zc), (pitch, yaw, roll)).

Also, the following inverse function is defined:

(x, y, z)=fdi((x', y', z'), (xc, yc, zc), (pitch, yaw, roll)).

Then, from (xp', yp', zp'), the direction of incidence (α, β) to the camera (origin) is determined. This operation is defined as follows:

(α, β)=fa(x, y, z).

Because the inverse function is a function of the direction of the coordinates, inverse function (x, y, z)=fai (α, β) cannot be defined. However, it is possible to define the function determining the coordinates (xd, yd, zd) indicating the direction as follows:

(xd, yd, zd)=fb(α, β); wherein xd=t×x, yd=t×y, zd=t×z, and t is a real number larger than 0.0. If function fa is applied to ((xp', yp', zp'), αp, βp), fa(xp', yp', zp') results.

From these results as well as those discussed above, it is possible to represent the relationship between space point (xp, yp, zp) and the coordinates (Xp, Yp) of a pixel on the output image as follows:

(Xp, Yp)=fs(fc(fa(fd((xp, yp, zp), (xc, yc, zc), (pitch, yaw, roll)))));

and it is possible to perform camera simulation. Because function fai cannot be defined, a pure inverse function cannot be defined. However, it is possible to determine coordinates (xv, yv, zv) of a point for estimating the space coordinates of the image pickup origin point.

The following can be represented:

(xv, yv, zv)=fdi(fb(fci(fsi(Xp, Yp)))), (xc, yc, zc), (pitch, yaw, roll)).

With (xc, yc, zc) deemed to be the starting point, (xp, yp, zp) is present near the line segment passing through (xv, yv, zv). Because Xp and Yp are rounded to positive integers, inversion is not possible. The result may not be on the line segment, but will be present nearby.

2. Concept of Viewpoint Conversion

Figure 13:
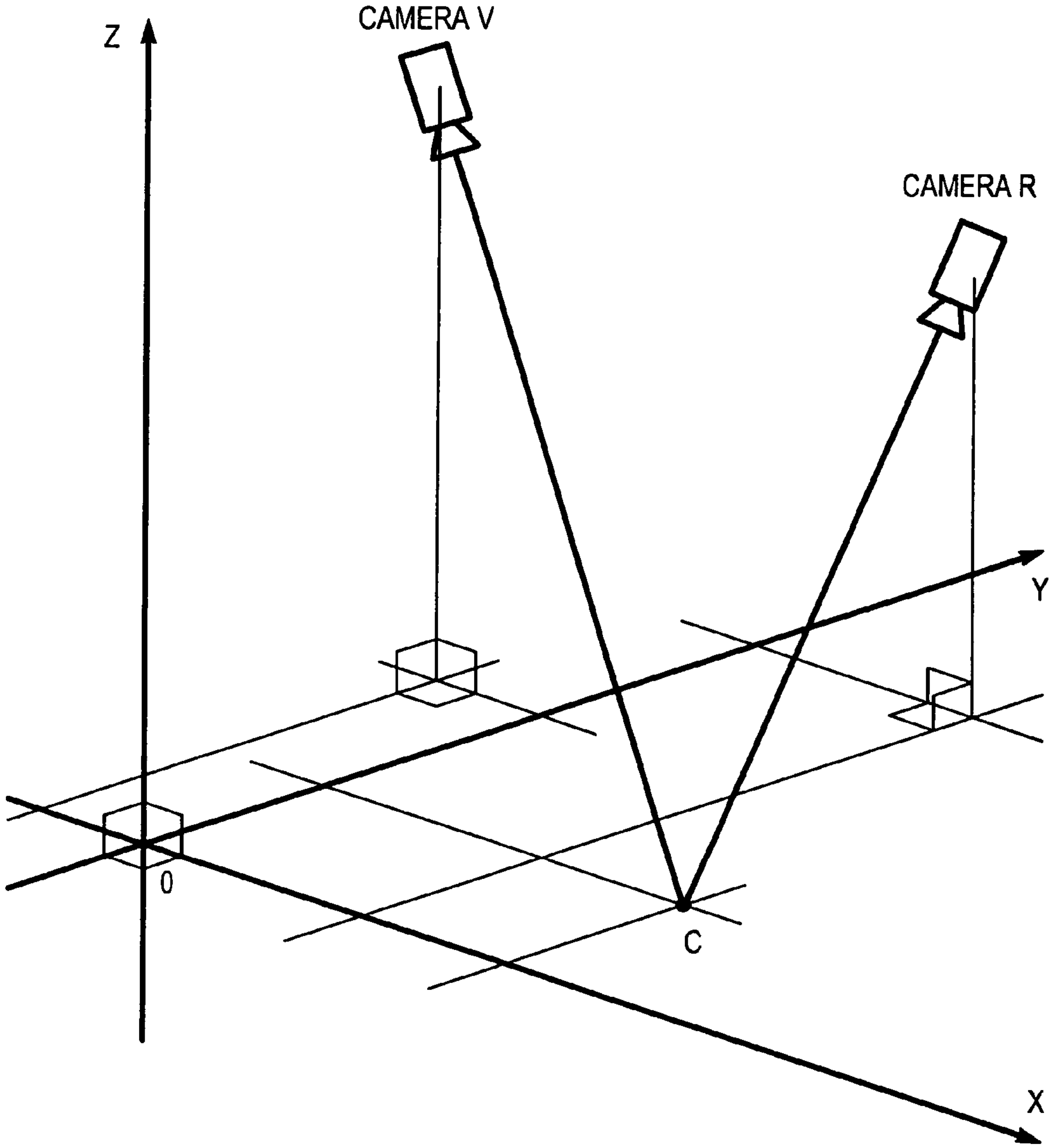
FIG. 13 is a diagram illustrating the concepts of viewpoint conversion.

In the following, an explanation will be given regarding viewpoint conversion using the concepts of camera simulation explained in sections 1-1 to 1-3 above. FIG. 13 is a diagram illustrating the viewpoint conversion. Assume that real camera R and virtual camera V are present in a space. The image of virtual camera V is generated using the image from real camera R.

The various parameters (position, direction, lens characteristics, etc.) of camera R and camera V have been defined above. The position of camera R is described as (x_r, y_r, z_r), the direction is described as (pitch_r, yaw_r, roll_r), and the various functions are denoted as fxx_r( ). Also, for camera V, the various parameters and functions can similarly be represented by using_v. That is, the position of camera V is represented by (x_v, y_v, z_v), the direction can be described as (pitch_v, yaw_v, roll_v), and the functions can be denoted as fxx_v( ).

When the image of camera V is generated using the image of camera R, the corresponding relationship between the pixels of the image of camera V and the pixels of camera R is computed simply.

Now, consider pixel (X_v, Y_v) of camera V. Since the direction of the incident light ray to form this pixel is determined from the result of the concepts of camera simulation discussed in sections 1-1 to 1-3 above, one has:

(tx, ty, tz)=fdi_v(fb_v(fci_v(fsi_v(X_v, Y_v))), (x_v, y_v, z_v), (pitch_v, yaw_v, roll_v)).

The coordinates (tx, ty, tz) indicate direction instead of the absolute position, and when the coordinates are determined, a certain reference is needed. Here, the x-y plane is deemed to be the reference plane. It is possible to determine the cross point C (x_c, y_c, 0) between the direction determined by (x_v, y_v, z_v) and (tx, ty, tz) and the reference plane. When z_v<tz, there is no cross point. The treatment for in this case will be explained later. In the following, an explanation will be given regarding the case where cross point C is in an image taken by camera R.

When the coordinates of cross point C on the image of camera R are (X_r, Y_r), one has:

(X_r, Y_r)=fs_r(fc_r(fa_r(fd_r((x_c, y_c, 0), (x_r, y_r, z_r), (pitch_r, yaw_r, roll_r))))).

In the above operation, it is possible to obtain the corresponding relationship between pixel (X_v, Y_v) of the image from virtual camera V and pixel (X_r, Y_r) of the picture from real camera R. The information of pixel (X_r, Y_r) of real camera R is copied to the pixel (X_v, Y_v) of the image from virtual camera V. When the image information from real camera R has the values of RGB, for example, the values of RGB are copied.

In the above, an explanation has been provided for the case where cross point C is not determined, and the case where the image of cross point C is not taken by camera R. In these cases, because the pixel (X_v, Y_v) of the image from virtual camera V has no pixel corresponding to the image from real camera R, a prescribed value, such as the value of black or the like, is substituted as the temporary pixel value (X_v, Y_v) in the image from virtual camera V.

For all of the pixels of the image from virtual camera V, the above-mentioned treatment is performed to establish the image from virtual camera V. Also, if there are plural real cameras R, the same treatment can be performed. In that case, the corresponding destination of pixel (X_v, Y_v) of the image from virtual camera V spans plural pixels of real camera R.

When there are no variations in the various parameters and various functions of camera V and camera R, the relationship between the images of camera V and camera R determined above is constant. Even when moving images are processed, one may simply store the results of a single computation. Consequently, high-speed processing is possible. Because the storage content is the relationship between (X_v, Y_v) and (X_r, Y_r), when the image from virtual camera V is composed of W_v lateral pixels and H_v vertical pixels, one may simply hold ((W_v)×(H_v)) data indicating the relationship. This is called a rearrangement table.

In the following, an explanation will be given regarding an example of the rearrangement table. First of all, with the rule shown in FIG. 12, address numbers are allotted to the pixels of the images of the cameras. The address number starts from unity and ends at W×H (this depends on the resolution of the camera). When the camera number is included with this address, it is possible to access the information of the various pixels of each camera. For example, if the camera number of camera R is 1, in order to access the pixel (xr, yr) of camera R, only access to pixels of 1: ((xr+yr)×(W_r+1)) is required. This is called the reference destination address. In the rearrangement table that establishes the image from virtual camera V, reference destination addresses with the same number as the number of pixels of the image from virtual camera V ((W_v)×(H_v)) are described. It is possible to access the information of the rearrangement table in the same way as pixels are accessed. In order to ascertain the information of pixel (xv, yv) of the image from virtual camera V, address ((xv+yv)×(W_v+1)) of the information in the rearrangement table is accessed, the reference destination address is acquired, and the influence of the pixel indicating the reference destination address is obtained.

3. Concept of Image Angle Conversion

Image angle conversion is a special solution of viewpoint conversion. Image angle conversion is different from viewpoint conversion in that there has to be one camera R, and the position of camera V and camera R are the same. Under these conditions, it is possible to perform the conversion operation using (tx, ty, tz) directly without determining cross point C. As (x_r, y_r, z_r)=(x_v, y_v, z_v)=(xA, yA, zA), one has the following formula:

(tx, ty, tz)=fdi_v(fb_v(fci_v(fsi_v(X_v, Y_v))), (xA, yA, zA), (pitch_v, yaw_v, roll_v)); and (X_r, Y_r)=fs_r(fc_r(fa_r(fd_r((tx, ty, tz), (xA, yA, zA), (pitch_roll_r))))).

By using the above-listed formula, it is possible to compute the corresponding relationship between (X_v, Y_v) and (X_r, Y_r).

In the case of viewpoint conversion, because a reference plane is used to perform the conversion treatment, an object image-pickup point other than z=0 is projected onto the reference plane, and specific distortion may take place. However, in the case of image angle conversion, because a reference plane is not used, and only the direction is used to perform conversion, it is possible to change the image pickup range and direction, the image angle, and the lens characteristics without distortion.

Also, in the case of image angle conversion, because only the direction is used to perform conversion, only the difference between the directions of camera R and camera V becomes a problem, and the results are the same whatever the absolute direction. Consequently, if the pitch directions of camera R and camera V differ by 5°, and camera R and camera V have the same resolution, by adopting N rounds of rearrangement using the table of rearrangement of camera R→camera V, it is possible to obtain images that deviate by (N×5) degrees.

Figure 14:
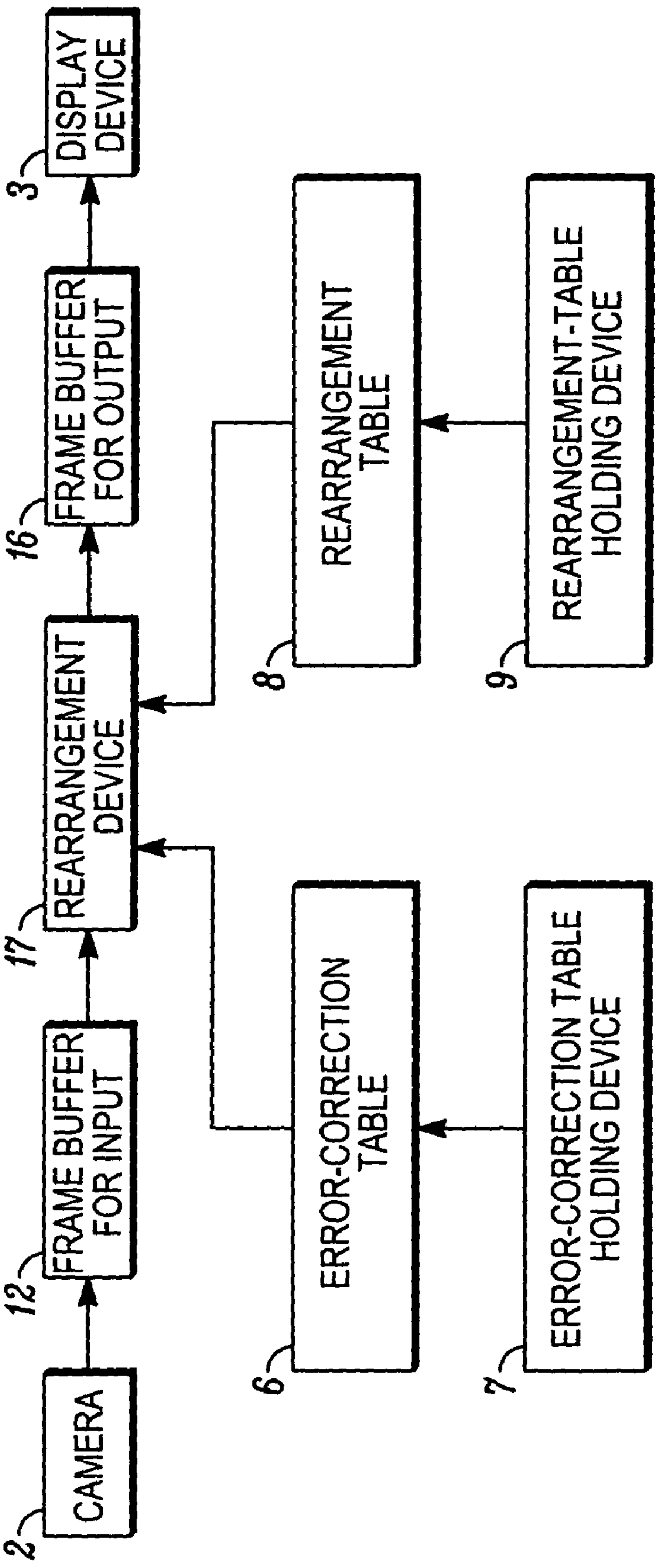
FIG. 14 is a block diagram illustrating an image generation device for a vehicle in an embodiment.

Alternative embodiments are next discussed. FIG. 14 is another block diagram illustrating an image generation device. In this figure, shown are the camera 2, frame buffer for input 12, frame buffer for output 16 and display device 3 previously mentioned. Also included are a rearrangement device 17, an error-correction table 6, a table-holding device for error correction (also known as an error-correction table holding region) 7, a rearrangement table 8 and a rearrangement table holding device (also known as a rearrangement table holding region) 9.

Using error-correction table 6 and rearrangement table 8, rearrangement device 17 rearranges the pixel data originally in input frame buffer 12 in output frame buffer 16. In the conventional system without the error correction function, only rearrangement table 8 is used to rearrange the pixel data originally in input frame buffer 12 in output frame buffer 16.

Error-correction table 6 is a table for correcting the error of the direction of camera 2. It rearranges within a virtual frame buffer having the same size as that of input frame buffer 12. Also, the virtual frame buffer is present in rearrangement device 17. Because the virtual frame buffer in input frame buffer 12 and rearrangement device 17 has the same size as that of the information held in it, access to the virtual frame buffer can be performed in the same way as in the access to input frame buffer 12. Consequently, for the results of rearrangement in error correction table 6, it is possible to use the same or different error correction table 6. Error correction table 6 uses the table generated with the concept explained in section 1-3, and, because error correction table 6 is for correcting the direction of camera 2, the image angle conversion described in section 3 is used.

The installation error of camera 2 includes a direction error (pitch, yaw, roll) and a position error. Depending on the specific condition for the camera installed on the vehicle body, the direction error includes the error of the camera itself and is ±3°, and the position error is about ±3 mm. Especially in a system in which a wide angle camera is used for image pickup in a wide range where image is presented to the driver, because the image pickup object is far away (a few meters away), and the image pickup range is wide, a significant direction error appears. However, in many cases, the position error is negligible. Consequently, there are no problems even if the correction content of the error-correction table is limited to direction, and the overall performance of the system can be improved.

Error correction table 6 may have the form where several results computed beforehand are held in error correction table holding device 7, and the user selects that in the desired correction state for use.

One may also adopt a scheme in which error correction table 6 is applied in plural rounds to perform correction. For example, when an error-correction table that corrects the yaw direction by 1° is stored, by applying this table three times, it becomes a table for correction of 3°. The result of three rounds of correction may be generated as a new error correction table and set in error correction table 6. Also, in rearrangement table 8, the mode of three rounds of application may also be adopted. In addition, different error-correction tables may be applied in several rounds in such a degree that an error-correction table that corrects yaw once is applied after application of a error-correction table that corrects the pitch once.

Because the error-correction table in the pitch and yaw directions of camera 2 depends on the lens characteristics, in order to avoid complicated computing, pre-computed results have to be held. On the other hand, the error in camera 2 in the roll direction is not related to the lens characteristics, and it becomes a simple image rotation. Because this pertains to a very simple computation, by generating an interior table for roll correction and then applying it, it is possible to reduce the number of error correction tables 6 pre-stored in error correction table holding device 7.

There is also a method in which an error-correction table is generated from plural error correction tables 6 in error correction table holding device 7. As an example, there is a method in which a table for correcting the pitch twice is generated from a table that corrects the pitch once and a table that corrects the pitch three times. Assume that the table for correcting the pitch once is Table 1, and the table for correcting the pitch three times is Table 2. Address A for common access is used to obtain reference destination address 1 and reference destination address 2 from Tables 1 and 2. Both of them show the pixels on input frame buffer 12. The coordinates in input frame buffer 12 of reference destination address 1 are designated (x1, y1), and the coordinates in input frame buffer 12 of reference destination address 2 are designated (x2, y2). The intermediate coordinates between the two sets of coordinates ((x1+x2)/2, (y1+y2)/2) are determined as the value of address A of the generating table. If the computing is performed for the addresses of all of the pixels, it is possible to generate the intermediate table between Table 1 and Table 2. This table can be used as an approximation of the table for two-round correction for error correction table 6. If the approximate table of the table for correcting the pitch by 1.5° is determined, one may adopt the formula for computing the intermediate coordinates as explained above as ((x1×3+x2)/4, (y1×3+y2)/4). In addition, the intermediate coordinates divided by m:n are indicated by ((x1×m×x2×n)/(m+n), (y1×m×y2×n)/(m+n) ). When the portion between Table 1 and Table 2 is narrow, a correct approximation is realized. On the other hand, when the portion between them is wide, it becomes incorrect. Consequently, such approximation becomes effective in obtaining the adjustment value in a narrow range.

Rearrangement device 17 uses error correction table 6 and rearrangement table 8 determined above in rearranging the pixel data originally in input frame buffer 12 in output frame buffer 16. For example, rearrangement table holding device 9 is a rearrangement table of a panoramic view image taken from above the automobile and generated using the methods described in section 2 from a different point of view.

In the following, an explanation will be given regarding the procedure in obtaining the pixel data of pixel (x0, y0) of output frame buffer 16. First, address B for access is computed using (x0, y0). As described in section 1-3, when output frame buffer 16 has lateral W_0 and vertical H_0, it is possible to determine it by means of (x0+y0)×(W_0+1). Then, by means of address B for access, rearrangement table 8 is accessed to obtain reference destination address C. By means of reference destination address C, error correction table 6 is accessed to obtain reference destination address D. Reference destination address D is used to access input frame buffer 12 to obtain the pixel data. When this procedure of operation is performed for all of the pixels of output frame buffer 16, the data in output frame buffer 16 are determined.

Because error correction table 6 is a table for correcting direction error of camera 2, even when rearrangement table 8 is replaced by another rearrangement table, a change in application of the error correction is still not required.

Also, when there are plural cameras 2, there should be the same number of input frame buffers 12 and error correction tables 6 for each camera 2. However, the specifications of the treatment are the same. When there are plural cameras 2 with the same specifications, it is possible to share the source of error correction table 6 in error correction table holding device 7. This is because error correction table 6 is determined by the lens characteristics containing the image angle, and it is independent of the installation position and direction. Because the various cameras 2 have different direction errors, however, it is necessary for error correction tables 6 to be independent with respect to respective cameras 2.

As explained above, plural error correction tables 6 corresponding to the magnitude of the installation error of camera 2 are prepared beforehand, and it is possible to regenerate the image in the direction for the intrinsic image taking operation by selecting an appropriate correction table. Also, error correction tables 6 correspond to the deviations in the direction of camera 2, that is, pitch, yaw and roll, and the tables define the rule for changing the address. If the pitch, yaw and roll are shifted by 0.5°, 1°, and 1.5°, respectively, the tables can define the corresponding relationship in changing a pixel of, e.g., (12, 12), to pixel (13, 14). The corresponding relationship is defined for all of the pixels in order to establish correspondence in the directions of pitch, yaw and roll of camera 2. Also, address numbers can be found from the coordinates of pixels. With this example, when input frame camera 2 is installed, the installer can select the appropriate correction table while viewing a monitor or the like, and it is possible to simplify the operation for installation of camera 2 for correct reproduction of the image (an installation-error correction operation).

A more detailed explanation of the error-correction tables follows. By means of the formula in section 3, it is possible to separate the directions of real camera R and virtual camera V (pitch_r, yaw_r, roll_r), (pitch_v, yaw_v, roll_v) and the position of virtual camera V (x-_, y_v, z_v). As a result, it is possible to establish a corresponding relationship between a pixel (X_v, Y_v) of camera V and a pixel (X_j, Y_y) of camera R. When the corresponding relationship between pixels is established, it is possible to establish a corresponding relationship between the address of a certain pixel of camera R and the address of camera V.

Here, if virtual camera V is the camera reference, when camera 2 is installed in the position and direction of camera V, its position and direction are determined by camera 2 itself. Also, because the actually installed real camera R contains a direction error with respect to virtual camera V, if a corresponding relationship exists between pixels error-corrected for real camera R and virtual camera V, it is possible to reproduce the image in the intrinsic installation direction as the image seen with virtual camera V. Concerning the error of real camera R that is actually installed, if the direction of the real camera (pitch_r, yaw_r, roll_r) is different from the direction of the virtual camera V (pitch_v, yaw_v, roll_v), the difference becomes the error.

Plural error correction tables 6 for correcting error are prepared corresponding to the magnitude of the error for all pixels, and by selecting the table that is appropriate for the actual error, an image can be reproduced in the intrinsic installation direction independent of the magnitude of the error.

As explained above, for the image generation device for a vehicle in this embodiment, an image of the surroundings of the vehicle taken by camera 2 is subjected to image conversion (that is, the input pixel data are rearranged and output) and is displayed for the driver. In this device, plural error correction tables 6 corresponding to the magnitude of the installation error of camera 2 are prepared beforehand. When image conversion is performed, error correction table 6 is deemed to be a reference for display so that the error in the direction of the image is corrected. Also, in the image generation method for a vehicle in this embodiment, plural error correction tables 6 corresponding to the magnitude of the installation error of camera 1 are prepared beforehand. When image conversion is performed, an error correction table is deemed to be a reference for display so that the error in the direction of the image is corrected. In this example, it is possible to correct the installation error of camera 2 easily, deviation in the input image caused by the installation error of camera 2 can be eliminated, and the pixels of the input image can be rearranged and the generated output image can be correctly maintained.

As explained above, the correction coordinate table in Japanese Kokai Patent Application No. 1997-159442 is for correcting intrinsic distortion of the optical system present for each camera, and it is not for correcting the direction error, etc., that occurs when the camera is installed. Also, because the correction coordinates of distortion of the optical system are determined using a measured value, it is difficult to prepare plural tables for correcting the direction error, etc. Consequently, it is impossible to correct the direction error during installation. In addition, because the plural error correcting tables are not a plurality corresponding to the direction error, it is impossible to select an appropriate table corresponding to any error generated when the camera is installed.

The image generation device for a vehicle in this embodiment includes at least one camera 2, input frame buffer 12 that has a image of camera 2 input as pixel data, rearrangement device 17 that rearranges the pixel data recorded in inpust frame buffer 12, output frame buffer 16 that records the pixel data rearranged by rearrangement device 17, display device 3 that displays the pixel data recorded in output frame buffer 16 as a image, rearrangement table 8 that records the rule for rearranging the pixel data originally recorded in input frame buffer 12 in output frame buffer 16, and error correction table 6 that describes the rule for correcting an error in installation of camera 2. Rearrangement device 17 uses rearrangement table 8 and error correction table 6 to rearrange the pixel data originally recorded in input frame buffer 12 in output frame buffer 16. By using error correction table 6 and rearrangement table 8, pixels are rearranged to generate an output image. Consequently, it is possible to easily correct the installation error of camera 2 without re-computing rearrangement table 8.

Also, error correction table 6 can be used as a table for correcting the installation error of single camera 2. When error correction table 6 is used for rearrangement of a single photograph as input, it is possible to represent the table using an even smaller capacity.

Error correction table 6 may also be used as a table for correcting the installation error of only the direction of camera 2. Excluding the correction of error of the position of camera 2, and by performing correction of the direction of camera 2 alone by error correction table 6, it is possible to adopt image angle conversion instead of viewpoint conversion in generation of error correction table 6. Consequently, error correction table 6 can be shared by cameras 2 having the same lens characteristics. As a result, more correction is possible with less table content.

It is further possible to adopt error correction table 6 as the table for correcting installation errors at least in the pitch direction and yaw direction of camera 2. As a result, it is possible to easily correct an installation error of camera 2 at least in the pitch direction and yaw direction.

Correction of at least the roll direction of camera 2 can be performed by computing error correction table 6 for the roll direction and then using error correction table 6 for correction. In this way, for correction of the error in at least the roll direction of camera 1, it is possible to realize correction using fewer tables by means of results of interior computing.

Error correction table 6 is for correcting installation error in the pitch direction and yaw direction of camera 2, and correction of the roll direction of camera 2 may be performed by computing or by generating a error-correction table in the roll direction and then using the error-correction table for correction. In this way, correction of the error in the roll direction of camera 2 can be realized using fewer tables by means of results of interior computing.

Error correction table 6 is for correcting the installation error of only the direction of camera 2, and rearrangement device 17 allows correction by applying error correction table 6 in plural rounds. That is, error correction table 6 for correcting at least the errors in the pitch and yaw directions, respectively, is present, and, by applying error correction table 6 for plural rounds, errors are corrected. Because error correction table 6 is for correcting the direction of camera 2, the size of input frame buffer 12 and the size of output frame buffer 16 are the same. Consequently, it is possible to apply error correction table 6 to the results obtained by application of error correction table 6, and it is possible to establish correspondence for more states of deviation with fewer tables.

Also, rearrangement device 17 can generate error correction table 6 by computations from two error correction tables 6. That is, plural reference error correction tables 6 that correct at least the errors in the pitch and yaw directions, respectively, are present. From these two error correction tables 6, it is possible to compute and generate a new error correction table 6. As a result, it is possible to establish correspondence for even finer correction with fewer tables.

Figure 15:
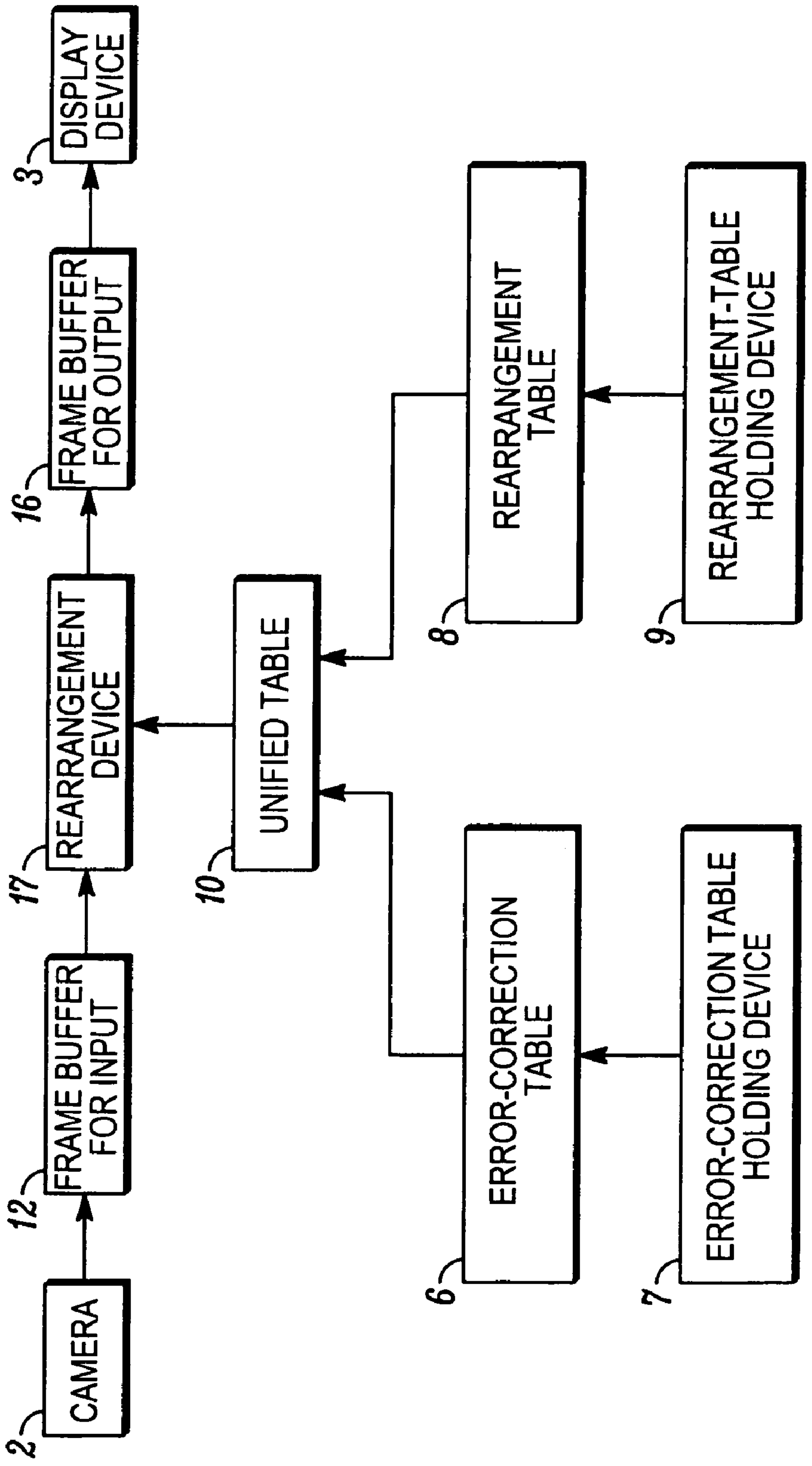
FIG. 15 is a block diagram illustrating an image generation device for a vehicle in another embodiment.

Yet another embodiment of an image generation device for a vehicle is shown in FIG. 15. In this figure, unified table 10 is shown.

As shown in FIG. 15, the following scheme may be adopted. At the time error correction table 6 and rearrangement table 8 are determined, unified table 10 of error correction table 6 and rearrangement table 8 is generated and kept, and rearrangement device 17 uses unified table 10 in operation. In the previous explanation, reference destination address C is determined from address B for access, reference destination address D is obtained from reference destination address C, and input frame buffer 12 is accessed. Unified table 10 holds a corresponding relationship for determining reference destination address D from address B for access. In this case, because reference is reduced by a stage, the number of access rounds to the memory is reduced. Consequently, it is possible to realize rearrangement by means of a bus and a processor with an even lower speed. When rearrangement table 8 is replaced by another one, one has to re-compute unified table 10.

As explained above, in the present embodiment rearrangement device 17 uses unified table 10 generated by unifying both error correction table 6 and rearrangement table 8, and the pixel data in input frame buffer 12 are rearranged in output frame buffer 16. That is, once error correction table 6 is selected, error correction table 6 is unified with rearrangement table 8, and direct rearrangement is performed using the obtained unified table 10. In this way, since there is a function in generating unified table 10 from error correction table 6 and rearrangement table 8, and it is possible to use the generated results in rearrangement, it is possible to re-construct rearrangement table 8 with simple computing, and it is possible to perform rearrangement with an even simpler processing mechanism.

This application is based on Japanese Patent Application No. 2005-184491, filed Jun. 24, 2005, in the Japanese Patent Office, the entire contents of which are hereby incorporated by reference.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An image generation device for a vehicle having at least one camera and a monitor that displays an image derived from images generated by the at least one camera, the image generation device comprising:

an input frame buffer operable to receive pixel data representing images generated by at least one camera;

a rearrangement table that describes rules for rearrangement of the pixel data;

an error-correction table that describes rules for adjusting the pixel data to correct an installation error of the at least one camera;

an output frame buffer for receiving rearranged pixel data for display as an image on the monitor; and a controller operable to read the pixel data from the input frame buffer, to rearrange the pixel data based on at least one of the rearrangement table and the error-correction table and to store the rearranged pixel data in the output frame buffer.

2. The image generation device according to claim 1, further comprising:

a unified table generated by unifying the rearrangement table and the error-correction table; and wherein the controller is operable to use the unified table to rearrange the pixel data.

3. The image generation device according to claim 1 wherein the error-correction table is a table for correcting the installation error of a single camera.

4. The image generation device according to claim 1 wherein the error-correction table is a table for correcting the installation error of only a direction of the at least one camera.

5. The image generation device according to claim 1 wherein the error-correction table is a table for correcting the installation error of the at least one camera in at least one of a pitch direction and a yawing direction.

6. The image generation device according to claim 1, further comprising:

means for correcting an error in a rolling direction.

7. The image generation device according to claim 6 wherein the means for correcting an error in a rolling direction further comprises means for computing an error-correction table in the rolling direction; and wherein the controller is operable to use the error-correction table in the rolling direction to rearrange the pixel data.

8. The image generation device according to claim 1 wherein the error-correction table is a table for correcting the installation error of the at least one camera in at least one of a pitch direction and a yawing direction, the device further comprising:

means for computing an error-correction table for a rolling direction; and wherein the controller is operable to use the error-correction table in the rolling direction to rearrange the pixel data.

9. The image generation device according to claim 1 wherein a size of the input frame buffer is identical to a size of the output frame buffer; wherein the error-correction table is a table for correcting the installation error of only a direction of the at least one camera; and wherein the controller is operable to perform correction in plural rounds using the error-correction table.

10. The image generation device according to claim 1 wherein the controller is operable to generate the error-correction table from two error-correction tables.

11. An image generation method for a vehicle incorporating an image generation device that receives pixel data representing images of surroundings of the vehicle from at least one camera and displays a composite image to the driver, the method comprising:

receiving plural error-correction tables corresponding to a magnitude of an installation error of the at least one camera;

reading the pixel data of a respective camera;

correcting the installation error of the respective camera by rearranging the pixel data of a respective image used to create the composite image using at least one of a rearrangement table describing rules for rearrangement of the pixel data and at least one of the plural error-correction tables; and displaying the composite image using the rearranged pixel data.

12. The image generation method according to claim 11, further comprising:

unifying the rearrangement table and the at least one of the plural error-correction tables into a unified table; and using the unified table while correcting the installation error.

13. The image generation method according to claim 11 wherein the at least one of the plural error-correction tables is a table for correcting the installation error of only a direction of the respective camera and correcting the installation error further comprises correcting a direction error of the respective camera.

14. The image generation method according to claim 11 wherein correcting the installation error of the respective camera further comprises correcting at least one of an error in a pitch direction and an error in a yawing direction.

15. The image generation method according to claim 11, further comprising:

computing an error-correction table in at least a rolling direction; and wherein correcting the installation error of the respective camera further comprises correcting an error of the respective camera at least in the rolling direction.

16. The image generation method according to claim 11 wherein the at least one of the plural error-correction tables is a table for correcting the installation error of the respective camera in a pitch direction and a yawing direction, the method further comprising:

computing an error-correction table for a rolling direction; and using the error-correction table for a rolling direction to correct an error in the rolling direction.

17. The image generation method according to claim 11, further comprising:

sequentially using the at least one of the plural error-correction tables while correcting the installation error of the respective camera.

18. The image generation method according to claim 11, further comprising:

computing the at least one of the plural error-correction tables using two of the plural error-correction tables.

* * * * *